Figure 1:
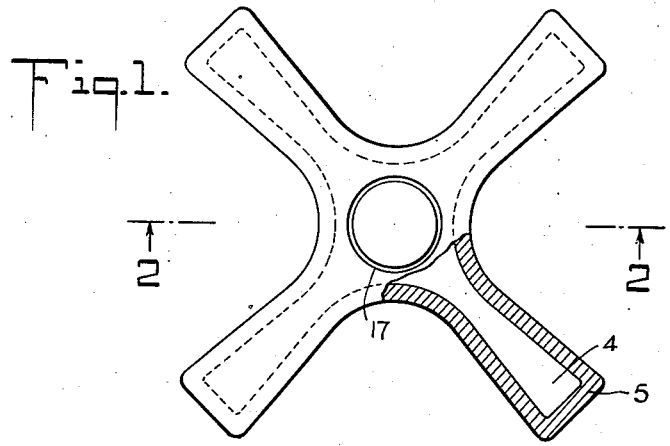

July 21, 1942.  R. P. PIPEROUX  2,290,249
INJECTION MOLDING
Filed April 22, 1938  2 Sheets-Sheet 1

INVENTOR
Rene P. Piperoux
BY
ATTORNEYS

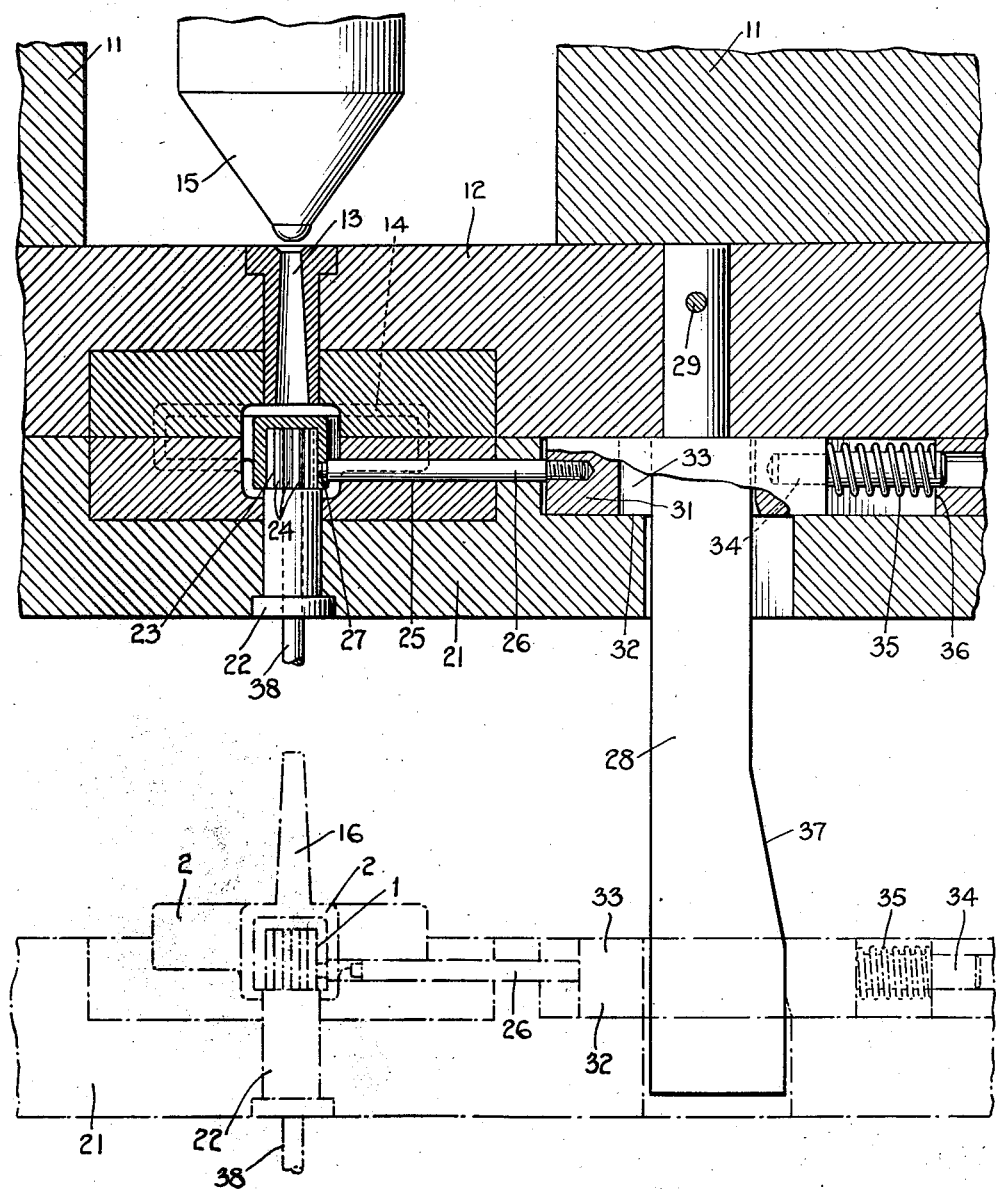

Patented July 21, 1942

2,290,249

UNITED STATES PATENT OFFICE 2,290,249

INJECTION MOLDING

Rene P. Piperoux, Radburn, N. J., assignor, by mesne assignments, to Celanese Corporation of America, a corporation of Delaware Application April 22, 1938, Serial No. 203,476

9 Claims. (Cl. 18—55)

This invention relates to the production of articles having the desired shape and without wrinkled or warped surfaces due to greater shrinkage of the thermoplastic material in one place than in another.

Another object of the invention is the production or articles of uniform color from translucent or opaque thermoplastic materials and having an insert of metal or other suitable material.

A further object of the invention is the production of articles by injection molding of thermoplastic materials which are uniform in appearance and that do not show discolored or offluster seams, spots or weld lines due to the flow of molten material during the molding operation. Another object of the invention is the production of articles which are free of two tone effects resulting from the removal of the sprue after molding.

A further object of the invention is the method of centering and holding a metal insert in the mold in a fixed firm position during the molding operation.

Other objects of the invention will appear form the following detailed description and drawings will be pointed out in the claims.

While the present invention is particularly applicable to the production of a faucet handle as shown in the drawings, it is also applicable to the production of other objects made with an insert which requires exact placing in the mold to insure injection molding of plastic material of even thickness and without forming objectionable weld lines. These weld lines are very pronounced if a pearl essence plastic material is employed.

Figure 2:
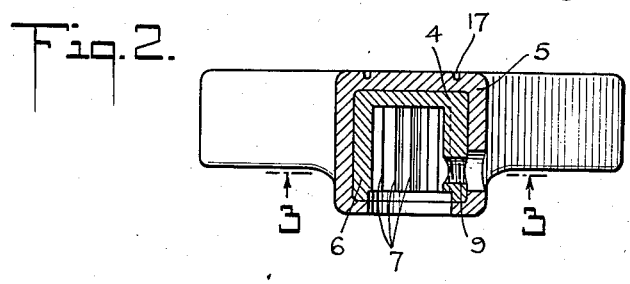
Figure 3:
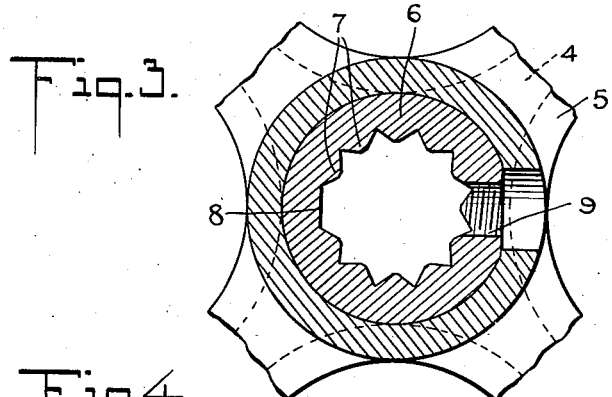
Figure 4:
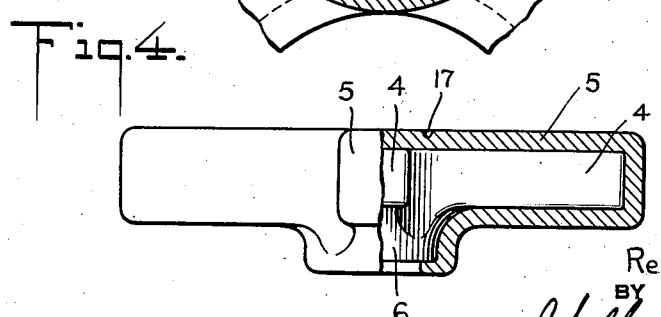

In the drawings is shown the invention as applied to the manufacture of a faucet handle. In the respective views, the same reference numerals refer to the same or similar elements:

Fig. 1 is a plan view, partly in section, of a faucet handle constructed in accordance with this invention, Fig. 2 is a sectional view taken on line 2—2 of Fig. 1, Fig. 3 is a sectional view taken on line 3—3 of Fig. 2, Fig. 4 is a side view, partly in section, of the handle shown in Fig. 1 and Fig. 5 is a cross-sectional view of a mold showing the means for positioning and retaining a metal insert during the molding operation, and for releasing the molded article upon opening the mold.

The manufacture of articles by injection molding of thermoplastic materials has been practiced for some time. Difficulty, however, was experienced in attempts to produce articles having a metal insert. The articles had a wrinkled or warped appearance due to the shrinkage of the thermoplastic material. Furthermore, the articles unless made of absolutely opaque thermoplastic material were not of uniform color. This was due to the metal insert allowing more light to pass through or be reflected from one part of the article than from another. This was often the case when the metal insert tipped during the molding operation, which quite often happened even to the extent of allowing a part of the bare metal to show in the finished object. The number of rejects prevented commercial injection molding of thermoplastic materials into articles having a metal insert. These objections I overcome by employing a metal insert of substantially the same shape as the finished articles such that the depth or thickness of the thermoplastic material is about the same over the article.

To prevent the article from having unsightly weld marks I extrude the thermoplastic material in such a manner that the flow of the material is from the top center of the article. This places the weld, if any, at the bottom or unseen part of the article. A further advantage gained by gating the article at the top is that when employing pearl essence the lustre or pearl effect is greatly enhanced. This is due to the longer flow of the thermoplastic material at the top surface of the article, thus arranging the scales which produce the pearl effect such that they are substantially parallel to the surface of the article and not standing on edge, i. e. normal to the surface of the article. The sprue being centered may be removed easily and the spot from which it is cut may be separated from the remaining surface by a groove which breaks the continuity of the surface and makes any slight color difference unnoticeable.

Injection molding of articles containing metal or other inserts has in the past offered difficulties in the positioning and retaining of the insert in the mold. Due to the viscosity of the thermoplastic materials and the speed and pressure under which it is extruded into the mold, the retaining of a metal insert in a fixed position during the molding operation is very difficult. I have overcome this difficulty by a mold having a cam-operated positioning pin and also by a novel form of support for the metal insert. By these means the metal inserts are properly positioned in the mold and held there against displacement, rotation, tipping and other movements during the injection of the thermoplastic material.

In accordance with my invention, I produce articles having a metal insert by injection molding a thermoplastic material, such as a derivative of cellulose, into a mold containing the metal insert. This I accomplish by employing an insert of substantially the same contour as the finished article and position and retain this insert in an exact position during the molding operation by a support in the mold allowing only one position of the insert and providing a mold with a cam-operated pin for holding the insert on the support. The mold is gated so that the injection of the material is at the top of the article instead of at the ends or sides, thereby eliminating objectionable weld lines at the points where the streams of molten material come together. The sprue is removed and at least a groove formed in the surface separating the spot from which the sprue is cut from the rest of the surface to break the continuity of the surface thus minimizing the visual effect of the two-tone color of the surface. If desired, a more intricate embossed and/or enameled design may be employed to completely eradicate the two-tone effect resulting from the removal of the sprue.

This invention may be employed in the production of faucet handles as shown in the drawings or it may be employed in the production of other handles or articles having a metal or other preformed insert such as knobs for radios, light or ignition buttons for mounting on dash boards of automobiles, automobile gear shift handles, knobs and buttons for electrical control boards, typewriter keys, screw driver handles, furniture accessories, novelties, etc. The articles containing an insert may be made by injection molding press mass powder, grains, chips, flakes, cubes, etc. of thermoplastic material containing a derivative of cellulose such as an organic derivative of cellulose. Organic derivatives of cellulose may be an organic acid ester of cellulose, a cellulose ether, a mixed ester of cellulose, or a mixed ester-ether of cellulose. Examples of the organic esters of cellulose are cellulose acetate, cellulose formate, cellulose propionate and cellulose butyrate, while examples of the cellulose ethers are ethyl cellulose, methyl cellulose and benzyl cellulose. Examples of mixed esters of cellulose are cellulose nitroacetate, cellulose aceto-butyrate and cellulose aceto-propionate, while examples of mixed ester-ethers of cellulose are benzyl cellulose acetate and methyl cellulose acetate. Mixtures of any of the above derivatives of cellulose as well as nitrocellulose having a suitable degree of nitration may also be employed.

Any other suitable thermoplastic material may be employed such as those containing artificial resins. Examples of such resins are the thermoplastic resins formed by the condensation or polymerization of formaldehyde and urea, phenol and formaldehyde, polyhydric alcohols and polybasic acids, toluene sulphonamide and aldehyde and the condensation or polymerization products of compounds containing the vinyl radical ($CH_2:CH$), for instance, acrylic and methacrylic acid esters, chlorinated derivatives of vinyl compounds and acid derivatives such as vinyl acetate, vinyl propionate, etc. or mixtures of these, also styrol and aldehyde reaction products of vinyl compounds known in the trade as Alvar, Formvar, Butalvar, Vinal, etc.

Any of the materials described in application S. No. 105,362, filed October 13, 1936, may be employed as the thermoplastic material.

The thermoplastic materials may contain, besides the base such as the derivative of cellulose or the resinous material, suitable effect materials such as plasticizers, pearl essence of fish scales, pigments, dyes, lakes, fire retardants, fillers, etc. The plasticizers may be the low boiling, medium boiling or high boiling plasticizers, or mixtures of these, depending upon the type of article desired, as is well known in the art.

The present invention may be employed upon or in connection with any suitable extrusion or injection molding machine, especially of the cylinder and piston type, examples of which are the devices shown and described in U. S. Patent No. 2,161,588.

Any suitable temperature and pressure may be employed depending upon the plastic material being extruded. In the extrusion of cellulose acetate and similar thermoplastic materials extremely high pressures may be employed. These may reach or exceed 15,000 pounds per square inch, but higher and lower pressures may be employed.

The metal insert may be of any suitable metallic material. However, the insert may be formed of a thermoplastic material having a higher melting point than that of the plastic material with which it is to be surrounded. For instance, the insert may be wood, Bakelite, pressed fiber, vulcanized fiber, etc. In either case the insert is preformed and is inserted, positioned and retained into the mold prior to the injection molding operation. Examples of suitable metals from which to form the metallic inserts are brass of various degrees of hardness, zinc alloy die casting metal, aluminum and its alloys, copper and iron or other alloys.

The invention will now be explained by describing the production of a single article, reference being made to the drawings. The drawings show the invention employed in the production of faucet handles. The faucet handle comprises a metal insert 4 having a coating of thermoplastic material 5 surrounding at least a part of same and placed thereon by injection molding methods. In the case of a faucet handle the metal insert 4 is provided with a hub 6 containing axially disposed teeth 7 adapted to register with similar teeth on the male or stem part of a faucet. These teeth allow the position of the handle in any one of a number of positions depending upon the number of teeth. For the purpose of positioning the metal insert in the mold the metal insert is made with a flat surface 8 formed by omitting one tooth thereon or removing one tooth from the formed insert. This surface is preferably on the side of the hub opposite to a tapped hole 9 adapted to receive a set screw to retain the faucet handle on the male member of the faucet. The omission of one of the teeth 7 to form the flat surface 8 does not interfere with the positioning of the handle on the male member of the faucet yet this allows a means of positioning the metal insert in a mold and also acts as a steadying influence during the molding operation due to the extended flat surface.

The article shown in Figs. 1 to 4 is formed in the mold shown in Fig. 5 which may be mounted on any suitable type of injection molding machine wherein there is a relative movement between the back and front face of the mold to open the same. In the drawing 11 is a part of the frame work of an injection molding machine to which is positively fastened the front face 12 of the mold. This front face 12 is provided with a channel 13 acting as a gate through which the material is extruded into the cavity of the mold 14 from any suitable type of nozzle 15. As shown in the drawing, this produces an article having a sprue 16 centered in the front face of the article. This sprue may be readily cut from the surface after which a groove 17 is cut into the article to separate the spot from which the sprue was cut from the remaining surface of the article. As stated above, this breaks the continuity of the surface at the place where the color changes thus making said color change practically unnoticeable. For most purposes this groove 17 may then be filled in with a different colored thermoplastic material or enamel and these colors may be used to distinguish, say, the hot and cold water faucets or light switch from ignition switch, etc. At the time the groove 17 is formed in the article the surface of the article within the groove may also be embossed with any suitable design, wording or configuration. The groove and any configuration within its circumference may be cut into the thermoplstic material or it may be embossed therein using a heated stamping element. The employment of a heated element is preferred as a flow of the material, which when employing pearl essence in the thermoplastic material, causes a flow of the material laying the scales in a position more parallel to the surface of the article. The extrusion of the material, however, being a considerable quantity in proportion to the size of the sprue and flowing as it does from the sprue out over the surface of the article, tends to lay the scales parallel with the surface of the article even at the spot from which the sprue is cut.

The above description of the flow of material from the nozzle is preferred but by a modified process the cavity of the mold may be gated slightly different to produce different effects. Pearl essence effects are produced by small flake-like lustrous particles disseminated through a translucent carrying mass. If this mass is forced through an orifice when in the plastic state, these lustrous particles will align themselves in the direction of the stream, the alignment being more or less perfect dependent upon the velocity. If such a mass is forced or extruded through a sheet-like orifice, such as produced by the top of the insert and the mold cavity face positioned as shown in Fig. 5, the result will be a flat or entirely lustrous surface without marked configurations, or with practically an absence of configuration. This is caused by the particles aligning themselves with their flat surface to the outside of the article. However, if the channel 13 is divided or quartered at or near the entrance to the mold cavity and especially if it branches out at a downward angle the streams of plastic issuing therefrom are caused to impinge against the insert, the mold walls and against each other producing a turbulent flow of material. The result is a configuration in the pearl effect such as swirls, bright spots, etc. more nearly matching the natural mother-of-pearl found in sea shells. By properly designing the orifice or gate through which the plastic material is injected into the mold, various configurations can be produced at will. While the above refers to pearl effects similar figures can be produced in mottles of two or more components.

The injection molding machine is provided with a back mold face 21 in which is rigidly mounted a male insert-retaining member 22. This member 22 terminates at the interior of the mold in a support 23 having teeth 24 corresponding to the grooves between the teeth 7 of the metal insert. On this member is a flat section corresponding to the surface 8 of the metal insert. By such a mounting the metal insert can be placed upon the male supporting member in only one position yet this does not interfere with the placing of the finished article on the male member of the faucet in any of the positions corresponding to the number of teeth thereon. In the back face of the mold, at the side opposite to this flattened space on the supporting member, is a channel 25 in which operates a pin 26 having a tapered end 27. This tapered end of the pin is designed to direct the pin 26 into the hole 9 of the metal insert thus bringing the metal insert to an exact position and retaining the same in that position during the extrusion of the material. The pin 26 is operated by means of a cam 28 which is permanently attached by means of the pin 29 to the front face of the mold. The pin 26 is formed or attached to a block 31 that acts as a cam follower and is adapted to reciprocate in a channel 32 in the back face of the mold.

The block 31 is slotted as at 33 and the cam 28 extends through the slot. Mounted in the block 31 at the end opposite to the pin 26 is a spring-supporting pin 34 having mounted thereon a suitable spring 35 which abuts against the face 36 formed in the back face of the mold. The spring 35 tends to force the block towards the mold cavity thereby tending to force the pin 26 into the insert 4. Upon the separation of the mold faces for the purpose of removing the formed article and the insertion of a new insert, the back face of the mold moves along the cam 28 to the position shown in dotted lines in Fig. 5. As the back face of the mold travels rearwardly with respect to the cam 28 the cam face at 37 pulls the block 31 in such a way that the pin 26 is pulled out of the insert and the formed article. The cam face 37 is so spaced and positioned that the pin 26 is removed from the metal insert just prior to that instant in which the knockout pin 38 operates to push the formed article from the mold.

It is to be understood that the foregoing detailed description is merely given by way of illustration and that many variations may be made therein without departing from the spirit of my invention.

Having described my invention, what I desire to secure by Letters Patent is:

1. Method of manufacturing molded articles of thermoplastic material by an injection molding process, which comprises positively positioning in a mold an insert having substantially the same contour as that desired in the finished articles, holding said insert against movement with respect to said mold, injecting molten thermoplastic material into said mold near the top center of said insert, delivering the article from said mold, removing the sprue from said article, and indenting the surface of the article about that portion from which the sprue was removed whereby the continuity of the surface of the article is broken.

2. Method of manufacturing molded articles of thermoplastic material by an injection molding process, which comprises positively positioning in a mold a metal insert having substantially the same contour as that desired in the finished articles, holding said insert against movement with respect to said mold, injecting molten thermoplastic material into said mold near the top center of said insert, delivering the article from said mold, removing the sprue from said article, and indenting the surface of the article about that portion from which the sprue was removed whereby the continuity of the surface of the article is broken.

3. Method of manufacturing molded articles of thermoplastic material by an injection molding process, which comprises positively positioning in a mold an insert having substantially the same contour as that desired in the finished articles, holding said insert against movement with respect to said mold, injecting molten thermoplastic material into said mold near the top center of said insert, delivering the article from said mold, removing the sprue from said article, and forming a groove in the article about that portion of the surface from which the sprue was removed whereby the continuity of the surface of the article is broken.

4. Method of manufacturing molded faucet handles of thermoplastic material by an injection molding process, which comprises positively positioning in a mold an insert having substantially the same contour as that desired in the finished faucet handle, holding said insert against movement with respect to said mold, injecting molten thermoplastic material into said mold near the top center of said insert, delivering the faucet handle from said mold, removing the sprue from said faucet handle, and forming a groove in the faucet handle about that portion of the surface from which the sprue was removed whereby the continuity of the surface of the faucet handle is broken.

5. Method of manufacturing molded faucet handles of organic derivative of cellulose material by an injection molding process, which comprises positively positioning in a mold an insert having substantially the same contour as that desired in the finished faucet handle, holding said insert against movement with respect to said mold, injecting molten organic derivative of cellulose material into said mold near the top center of said insert, delivering the faucet handle from said mold, removing the sprue from said faucet handle, and indenting the surface of the article about that portion from which the sprue was removed whereby the continuity of the surface of the article is broken.

6. Method of manufacturing molded faucet handles of cellulose acetate material by an injection molding process, which comprises positively positioning in a mold an insert having substantially the same contour as that desired in the finished faucet handle, holding said insert against movement with respect to said mold, injecting molten cellulose acetate material into said mold near the top center of said insert, delivering the faucet handle from said mold, removing the sprue from said faucet handle, and indenting the surface of the faucet handle about that portion from which the sprue was removed whereby the continuity of the surface of the faucet handle is broken.

7. A molded article comprising an insert covered by a substantially uniform thickness of a thermoplastic material and having a sprue mark only at the top center thereof and a weld line on the bottom surface only, said sprue mark being separated from the remaining top surface of said article by a groove.

8. A molded article comprising an insert covered by a substantially uniform thickness of a thermoplastic material and having a sprue mark only at the top center thereof and a weld line on the bottom surface only, said sprue mark being separated from the remaining top surface of said article by a circular groove completely surrounding said sprue mark.

9. A molded article comprising an insert covered by a substantially uniform thickness of a thermoplastic material having effect materials therein, said article having a sprue mark only at the top center thereof and a weld line on the bottom surface only, said sprue mark being separated from the remaining top surface of said article by a groove

RENE P. PIPEROUX.